Patented Dec. 2, 1941

2,264,337

UNITED STATES PATENT OFFICE 2,264,337

METALLURGY OF ZINC FUMES AND OTHER POWDERY METALLIFEROUS MATERIAL CONTAINING ZINC AND OTHER METALS

William Seguine and John Zweyer, Jr., Baltimore, Md., assignors to The Glidden Company, Cleveland, Ohio, a corporation of Ohio No Drawing. Application August 2, 1940, Serial No. 350,088

4 Claims. (Cl. 75—115)

This invention relates to the metallurgy of zinc and more particularly to the metallurgy of zinc when associated with certain valuable metals, such as copper, lead and tin. The invention also relates particularly to the hydro-metallurgy of zinc.

Among the objects of this invention is the recovery of zinc from metallurgical by-products and particularly the separation of zinc from a by-product zinc fume produced during the smelting of secondary non-ferrous metals.

A further object of this invention is the separation of the zinc, lead and tin from one another in such a manner as to remove certain impurities, such as copper and arsenic, in an economic and novel manner.

A further object of this invention is the removal of organic matter from powdery material containing zinc, lead, tin and other metallic compounds, said other metallic compounds including acid-soluble as well as acid-insoluble compounds.

A further object of this invention is to remove chlorine compounds from powdery material, such as metallurgical fumes containing zinc, lead, tin and other metallic compounds, said other metallic compounds including acid-soluble compounds as well as acid-insoluble compounds.

A further object of this invention is to convert the lead, tin and antimony content of powdery material, such as metallurgical fumes, containing compounds of these metals which, when attacked by acid, form colloidal matter which settles slowly and is difficult to filter into compounds of these metals which, when attacked by acid, form matter which filters more readily and settles more rapidly than said colloidal matter.

A further object of this invention is to form acid-soluble compounds of iron and copper from the iron and copper content of powdery material, such as metallurgical fumes, comprising acid-insoluble compounds of iron and copper.

A further object of this invention is to produce substantially pure zinc sulfate from powdery material, such as metallurgical fumes, containing organic matter and zinc, lead, tin, cadmium, nickel, copper, iron, arsenic, antimony and chlorine compounds.

A further object of this invention is the recovery of lead and tin from powdery metalliferous material, such as metallurgical fumes.

Other, further and more specific objects of this invention will become readily apparent to persons skilled in the art from a consideration of the following description.

In the smelting of copper, it is usual to recover copper from ores, concentrates and the like by first smelting these ores, concentrates, etc. with coke and fluxes in appropriate blast furnaces, forming thereby a compound composed of copper, iron and sulfur which is termed a matte. This matte, while still in a liquid condition, is further treated by the well known Bessemer process whereby the iron and sulfur are removed and finally blister copper is obtained. The blister copper is further refined to pure commercial copper by electrolytic treatment.

Since, in the vicinity of some copper smelters there is available a very large quantity of scrap copper materials, it is customary to treat these scrap materials together with the aforesaid ores and concentrates. Non-metallic scrap, for example, oxidized materials, is customarily charged int othe blast furnace, whereas coarse metallics may be placed in the Bessemer converter and so treated. This scrap, however, will almost invariably contain large amounts of zinc, lead and tin, so that in copper smelting it is found that these metals, on account of their volatility and the volatility of their compounds, are fumed out into the blast furnace gases and also into the converter gases. To avoid public nuisance and for economic reasons, it is necessary to cool and filter these gases through appropriate devices, such as woolen bags, electrical precipitators, and the like, so that the smelter may discharge a harmless gas to the atmosphere.

By this means, a fume is collected which will analyze approximately as follows:

| | Per cent |
|---|---|
| Zinc | 45 |
| Lead | 15 |
| Tin | 4 |
| Copper | 1 |
| Iron | 0.5 |
| Arsenic | 0.3 |
| Antimony | 0.3 |
| Chlorine | 1.5 |

In addition, there will be present various indeterminable quantities of organic matter derived from the coke and organic constitutents of the smelter charges.

This zinc content exists substantially as zinc oxide, with minor amounts of zinc sulfate and zinc chloride, and is readily extractable from the fume by sulfuric acid. However, when this fume is leached with sulfuric acid, the resulting zinc sulfate is quite impure, containing as it does substantial amounts of zinc chloride and organic matter.

The high quantity of chlorides in such a zinc sulfate solution precludes the successful use of such solutions in the manufacture of lithopone, electrolytic zinc, or zinc sulfide, as is well known to those skilled in the art.

Also, the acid-extract solution will contain minor amounts of sulfates of copper, cadmium, iron, nickel and manganese. In the presence of common soluble organic matter, it is difficult to precipitate cadmium and nickel by the use of zinc dust in the well known hydro-metallurgical separation processes.

Furthermore, when this fume is leached with sulfuric acid, as heretofore described, there remains an insoluble and colloidal residue composed of lead sulfate, tin oxide, plus other insoluble substances, such as the arseniates and antimoniates of lead. These colloidal substances are extremely difficult to filter and are very slow in settling, thus forming a formidable impediment to the mechanical handling and washing, so that complete extraction of the zinc is commercially uneconomical.

Also, copper remains in the residue. Such copper is presumed to exist in such residue as "matte" and as particles of such matte mechanically carried over in the bessemerizing or smelting of the copper. This matte is a double sulfide of iron and copper, and is insoluble in weak sulfuric acid, but upon roasting the copper becomes soluble in acid. Likewise, the iron to a marked degree becomes soluble. Since copper constitutes a serious impurity in the lead-tin alloy obtained from smelting this residue, removal of copper by hydro-metallurgical methods is of pronounced economic advantage.

We have found that if the raw metallurgical fume is calcined at temperatures ranging from 500–900° C., and more particularly through the ranges 600–800° C., the chlorides are substantially all driven off by volatilization, the organic matter is consumed, the copper and iron compounds are converted to acid-soluble form and the filterability and sedimentation properties of the aforesaid insoluble residue of lead and tin are substantially increased. We have also found that, if the fume per se is roasted, the subdivision or fineness of the fume is such that a very large quantity is mechanically thrown into the gases of combustion by the agitation which is inherent in mechanical roasting furnace operations; for example, in a rotary kiln or a hearth furnace of the Wedge or Herreshoff type. This constitutes a serious loss and disadvantage.

We have discovered that, if the aforesaid fume is moistened with water in quantities ranging from 15 to 25%, it agglomerates into pebbles or balls with the evolution of considerable heat and these pellets or coarse granules can be roasted in the above furnaces without any material dust loss.

We have also found that, by this roasting process, chlorides are evolved, thus reducing the chlorine content of the zinc sulfate solution to a substantial degree, when the roasted granules are subsequently attacked with sulfuric acid.

An important consideration of this technique is that substantial amounts of copper are recovered in a commercial form, thus adding to the economic value of the roasting operation.

The resulting lead-tin residue obtained from this leaching and subsequent washing of the precipitate is substantially free from zinc and copper so that it becomes a more economic and easy operation to smelt this residue to a lead-tin alloy.

A specific example of carrying out our invention is as follows:

A metallurgical fume as heretofore described and of the above analysis is mixed with 15–25% water and agglomerated into coarse granules, balls and pellets and then roasted at 600–800° C. The organic matter of the fume is consumed and the chloride content is substantially all driven off by volatilization.

The roasted product is then attacked with $H_2SO_4$ in a dissolving tank and the residue or pulp is separated from the liquor by sedimentation, filtration and/or centrifugal action. The residue is then washed and we prefer to return the washed water to the dissolving tank, where the roasted mass is attacked with $H_2SO_4$. This washed residue consists chiefly of $PbSO_4$ and $SnO_2$, with a small content of copper compounds and oxygenated lead compounds of arsenic and antimony. It can now be treated for the recovery and separation of the metal contents thereof.

The liquor, which is separated from the pulp after the acid treatment, is practically free of chlorides and consists chiefly of $ZnSO_4$ solution and also small quantities of the sulfates of Cu, Fe, Cd and Ni. Manganese sulfate is also sometimes found in small quantities. This liquor is now subjected to the usual purification and refining, whereby pure $ZnSO_4$ solution is obtained. From this pure $ZnSO_4$ solution pure metallic zinc, ZnS and/or lithopone may be obtained, of high grade and quality.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. A process comprising removing organic matter and chlorine compounds from powdery material containing organic matter and zinc, lead, tin, cadmium, nickel, copper, iron, arsenic, antimony and chlorine compounds, said process including adding water to said powdery material and forming coarse particles thereof, and then roasting said coarse particles, whereby the organic matter is burned away and chlorine compounds therein are volatilized, and then subjecting the roasted product to $H_2SO_4$ extraction.

2. A process comprising removing zinc, iron and copper content of powdery material comprising acid-insoluble compounds of iron, copper and other metals, said process including adding water to said powdery material and forming coarse particles thereof, and then roasting said coarse particles, and then subjecting the roasted product to $H_2SO_4$ extraction.

3. A process comprising removing zinc, iron, nickel, cadmium, and copper content of powdery material comprising organic matter, chlorine compounds and acid-insoluble compounds of iron, copper, lead, tin, arsenic and antimony, said process including adding water to said powdery material and forming coarse particles thereof, and then roasting said coarse particles, and then subjecting the roasted product to $H_2SO_4$ extraction.

4. A process of making substantially pure zinc sulfate from powdery material containing organic matter and zinc, lead, tin, cadmium, nickel, copper, iron, arsenic, antimony and chlorine compounds, said process comprising adding water to said powdery material and forming coarse particles thereof, then roasting said coarse particles to form acid-soluble compounds of zinc, iron, nickel, cadmium and copper from the content of zinc, iron, nickel, cadmium and copper of said powdery material, extracting the roasted product with $H_2SO_4$, and then removing the copper, iron, nickel and cadmium content from the $H_2SO_4$ extract.

WILLIAM SEGUINE.
JOHN ZWEYER, Jr.